United States Patent [19]

Geernaert

[11] Patent Number: 4,917,549
[45] Date of Patent: Apr. 17, 1990

[54] BORING MACHINE

[76] Inventor: Richard W. Geernaert, 350 Morris St., Sebastopol, Calif. 95472

[21] Appl. No.: 280,011

[22] Filed: Dec. 5, 1988

[51] Int. Cl.4 .......................... B23B 41/00; B23B 49/00
[52] U.S. Cl. ........................................ 408/42; 408/53; 408/112
[58] Field of Search ...................... 408/51, 53, 97, 112, 408/95, 98, 110, 31, 14, 42

[56] References Cited

U.S. PATENT DOCUMENTS

| 1,079,650 | 11/1913 | Jordan | 408/53 |
| 2,234,789 | 3/1941 | Wunderlich | 408/51 |
| 2,918,833 | 12/1959 | Stewart et al. | 408/112 |
| 4,059,162 | 11/1977 | Zbinden et al. | 173/37 |
| 4,286,902 | 9/1981 | Gagliano et al. | 408/112 |

FOREIGN PATENT DOCUMENTS

| 2432137 | 1/1976 | Fed. Rep. of Germany | 408/103 |
| 99529 | 4/1987 | Japan | 408/31 |
| 563266 | 8/1944 | United Kingdom | 408/52 |

Primary Examiner—Daniel Howell
Attorney, Agent, or Firm—Larry D. Johnson

[57] ABSTRACT

A boring machine provides a pair of motor-driven drills mounted to a template so that the drill chucks are aligned in parallel, side-by-side arrangement in a housing beneath the template. A guide mechanism, including a front plate with a pair of guide holes, is also mounted beneath the template, with a pair of spring loaded guide rods extending from the front plate to the housing. A pair of stops are positioned between the front plate and the housing providing a limit to travel of the front plate.

6 Claims, 2 Drawing Sheets

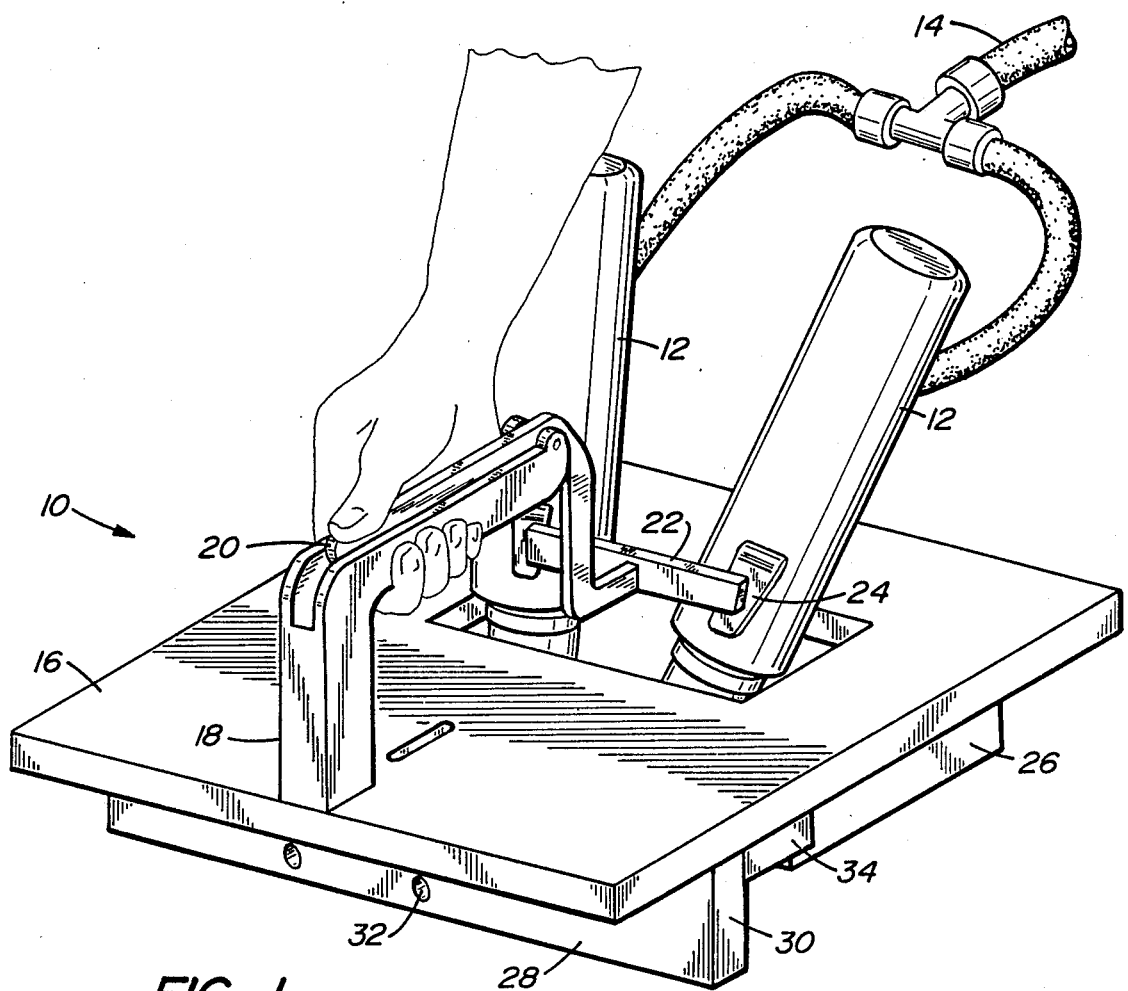
FIG._1
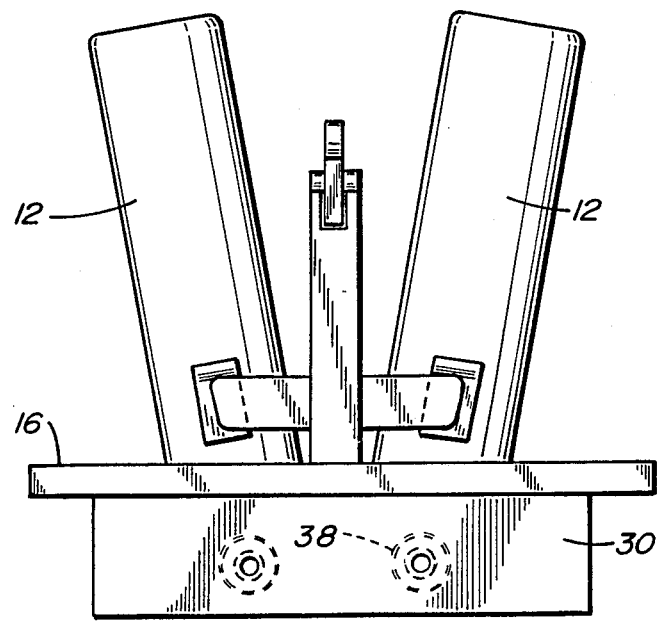
FIG._4

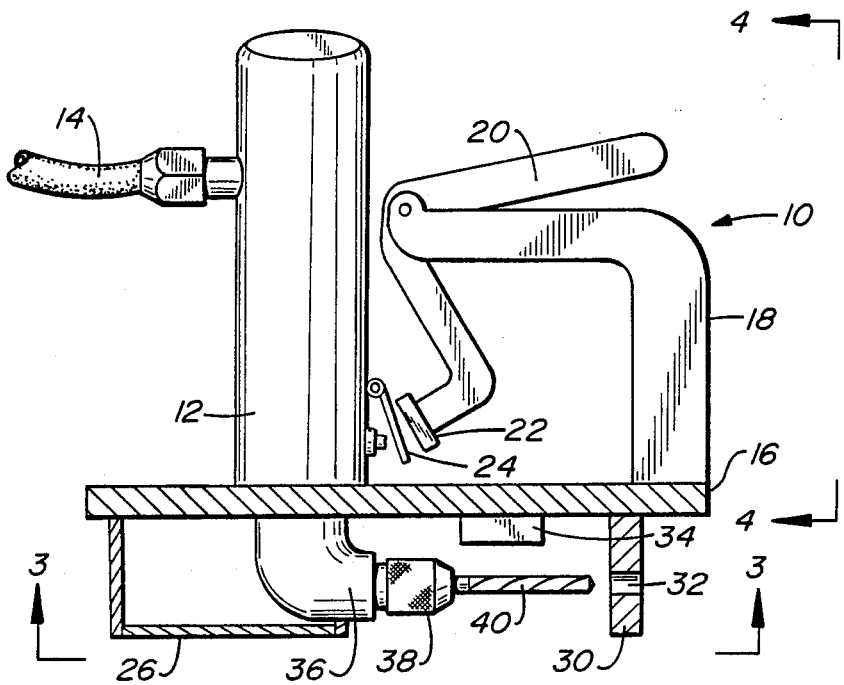
FIG._2
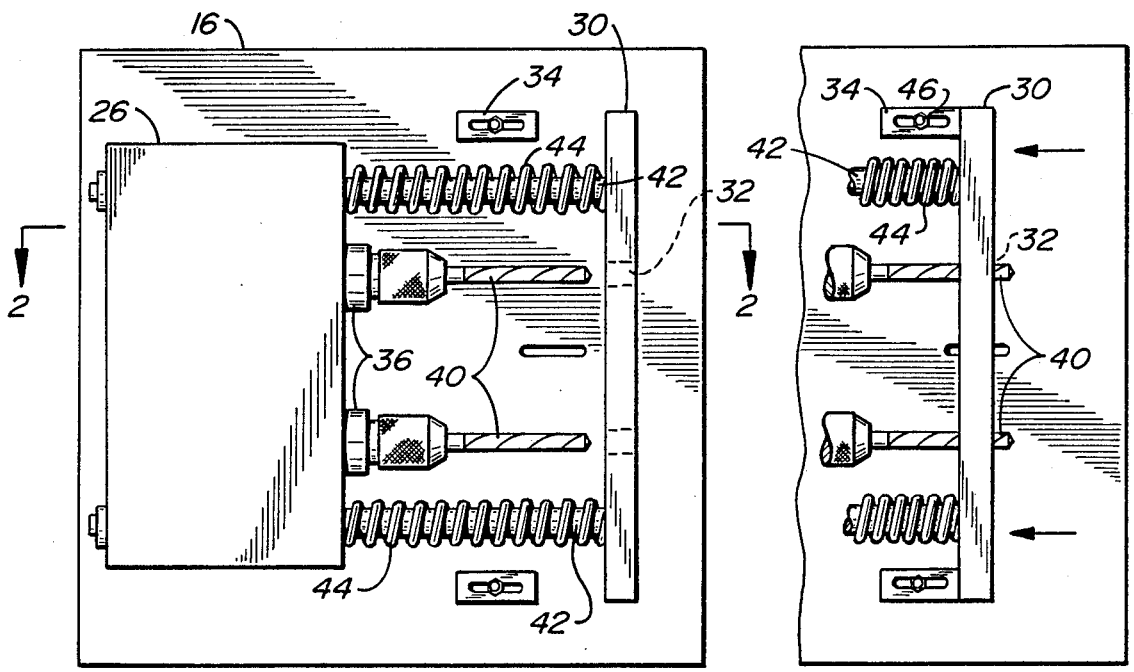
FIG._3  FIG._3A

BORING MACHINE

BACKGROUND OF THE INVENTION

1. Field of the Invention

This invention relates generally to drills and related boring tools, and more specifically to an improved device for drilling a pair of holes of pre-set spacing and depth.

2. Description of the Prior Art

Power drills and related boring mechanisms are well known. Typically, such machines provide a motor to drive a single drill bit into a material to create the desired hole. However, certain trades and professions, such as cabinetry, regularly require the drilling of a pair of spaced holes for installation of brackets, hinges and the like. Typically, these holes are to be spaced a specific center-to-center distance apart, determined by the spacing of the screw holes in the hardware being installed. Individual single-hole drilling of such holes is time-consuming, and prone to error in spacing.

SUMMARY OF THE INVENTION

The boring machine of this invention provides a pair of motor-driven drills mounted to a template so that the drill chucks are aligned in parallel, side-by-side arrangement in a housing beneath the template. A guide mechanism, including a front plate with a pair of guide holes, is also mounted beneath the template, with a pair of spring loaded guide rods extending from the front plate to the housing. A pair of stops are positioned between the front plate and the housing providing a limit to travel of the front plate.

In operation, the template is placed on the material such as a cabinet frame, above the edge of the frame to be drilled, so that the base of the template is supported by the cabinet frame, and the guide mechanism front plate beneath the template is positioned adjacent the portion of the edge of the frame to be drilled. The drill motor is then activated, and the template manually pushed in the direction of the frame edge. The guide mechanism front plate retracts by moving the spring-loaded guide rods back into the housing, and the rotating drill bits penetrate guide holes in the front plate to begin to drill holes in the cabinet frame edge. The front plate continues to retract until it contacts the stops positioned between the front plate and the housing, thus preventing further drill bit penetration, and defining the depth of the holes drilled in the frame edge. The template can then be manually pulled back away from the frame edge, allowing the front plate to re-extend past the drill bits, and the drill motor can be turned off. Thus, a pair of holes can be simultaneously drilled in the material, to a predetermined spacing (defined by the spacing between the drill chucks) and predetermined depth (defined by the position of the stops behind the front plate).

BRIEF DESCRIPTION OF THE DRAWINGS

FIG. 1 is a perspective view of the boring machine of this invention, illustrating an operator's hand squeezing the trigger of the machine to activate the drill motors and initiate drilling;

FIG. 2 is a side elevation cross-sectional view of the boring machine of this invention, illustrating the trigger in its off position, and the guide mechanism front plate in its extended (pre-boring) position beneath the template;

FIG. 3 is a bottom view of the boring machine of this invention, again illustrating the guide mechanism front plate in its extended (pre-boring) position, this view being taken along line 3—3 of FIG. 2;

FIG. 3A is a partially cutaway bottom view of the boring machine of this invention, illustrating the guide mechanism front plate in its retracted (boring) position and contacting the stop portions, with the two drill bits penetrating the front plate; and FIG. 4 is a front elevation view of the boring machine of this invention, this view being taken along line 4—4 of FIG. 2.

DETAILED DESCRIPTION OF A PREFERRED EMBODIMENT

FIG. 1 is a perspective view of the boring machine 10 of this invention. Boring machine 10 comprises a pair of pneumatic drill motors 12 fed compressed air via air hose 14. Of course, any other type of motive power, such an electric motor, could be used to provide the requisite rotary drive. Indeed, a single motor of any type could be appropriately geared to provide the dual rotary drives required by this invention. These motors are mounted to a template 16, having a handle 18 and trigger 20 configured to activate the motors, as by trigger base 22 simultaneously compressing switch plates 24 to start the motors.

Housing 26 is mounted beneath template 16, and contains a right-angle drive mechanism (described infra). Guide mechanism 28, including front plate 30 and guide holes 32, are similarly mounted beneath template 16, so that the front plate 30 can retract to contact stop portion 34.

FIG. 2 is a side elevational cross-sectional view of the boring machine 10 of this invention, illustrating the trigger 20 in its off position, and the guide mechanism front plate 30 in its extended (pre-boring) position beneath the template 16. This view illustrates right-angle drive mechanism 36, mounted in housing 26, to convert the vertically-oriented rotational motion produced by drill motor 12 to the horizontally-oriented rotational motion required by this apparatus. Alternatively, a co-linear motor arrangement could of course be mounted entirely beneath the template to achieve the same result. Drive mechanism 36 rotates chuck 38 and bit 40, here illustrated aligned with but not yet penetrating hole 32 in front plate 30.

FIG. 3 is a bottom view of the boring machine of this invention, again illustrating the guide mechanism front plate 30 in its extended (pre-boring) position, this view being taken along line 3—3 of FIG. 2. Front plate 30 is connected to housing 26 by a pair of guide rods 42 suspended by springs 44. Drive mechanisms 36 are positioned within housing 26 so that the center-to-center distance of drill bits 40 is precisely the spacing required by the mounting hardware being installed (for example, European-style hardware has a typical spacing of thirty-two millimeters between screws).

FIG. 3A is a partially cutaway bottom view of the boring machine of this invention, illustrating the guide mechanism front plate 30 in its retracted (boring) position and contacting the stop portions 34, with the two drill bits 40 penetrating the front plate 30 through guide holes 32. This view illustrates that stop portions 34 may be adjusted by appropriate loosening of screws 46 and repositioning of the stops, to permit greater or lesser retraction of front plate 30, thus enabling control of the hole depth drilled by the drill bits.

FIG. 4 is a front side elevation view of the boring machine of this invention, this view beint taken along line 4—4 of FIG. 2. This view illustrates a head-on view of the front plate 30, with rotating drill chucks 38 shown in phantom behind the front plate.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims.

What is claimed as invention is:

1. A boring machine for drilling a pair of holes in an article having an outside surface and an inside surface to be drilled, said inside surface to be drilled generally perpendicular to said outside surface, said boring machine comprising:

a template member for placement against said article outside surface;

motor means connected to said template member;

switch means for activating said motor means;

a pair of drill members connected to said motor means and mounted in a housing beneath said template member in parallel, side-by-side arrangement, said drill members oriented generally parallel to said template member and said article outside surface, and perpendicular to said article inside surface to be drilled;

a guide mechanism including a front plate, said front plate connected to said template member by at least one guide rod member conditioned to retract relative to said housing, said front plate including a pair of guide holes conditioned to permit penetration of said front plate by said drill members; and stop means for limiting the retraction of said guide rod member, wherein when said boring machine is placed adjacent said article so that said template member is against said article outside surface and said front plate is against said article inside surface to be drilled, and said switch means activates said motor means, said boring machine may be moved so that said front plate and said guide rod member retract relative to said housing, and said drill members drill a pair of holes in said article inside surface.

2. The boring machine of claim 1 wherein said motor means comprises a pair of motors, each of said motors for driving a single one of said drill members.

3. The boring machine of claim 1 wherein said motor means is mounted above said template member, and including a right-angle drive mechanism mounted below said template member to drive said drill members.

4. The boring machine of claim 1 wherein said front plate is connected to said housing by a pair of guide rods, said guide rods including spring members conditioned to re-extend said front plate after retraction of said front plate relative to said housing.

5. The boring machine of claim 1 wherein said stop means are movable to permit adjustment of drilling depth.

6. The boring machine of claim 1 wherein each of said drill members has a center, and said drill member centers are mounted approximately thirty-two millimeters apart from one another.

* * * * *